(12) United States Patent
Kronenbitter et al.

(10) Patent No.: US 11,105,365 B2
(45) Date of Patent: Aug. 31, 2021

(54) FIXATION SYSTEM

(71) Applicant: Hansgrohe SE, Schiltach (DE)

(72) Inventors: Bernd Kronenbitter, Nordrach (DE); Alois Schönweger, Schiltach (DE); Thomas Stulz, Oberwolfach (DE)

(73) Assignee: Hansgrohe SE, Schiltach (DE)

( * ) Notice: Subject to any disclaimer, the term of this patent is extended or adjusted under 35 U.S.C. 154(b) by 539 days.

(21) Appl. No.: 15/837,028

(22) Filed: Dec. 11, 2017

(65) Prior Publication Data

US 2018/0163774 A1 Jun. 14, 2018

(30) Foreign Application Priority Data

Dec. 13, 2016 (DE) .......................... 102016224806.5

(51) Int. Cl.
*F16C 11/06* (2006.01)
*F16M 11/14* (2006.01)
(Continued)

(52) U.S. Cl.
CPC ................ *F16C 11/06* (2013.01); *F16B 7/00* (2013.01); *F16B 9/052* (2018.08); *F16B 9/058* (2018.08);
(Continued)

(58) Field of Classification Search
CPC ....... F16M 11/14; F16M 11/2078; F16B 2/16; F16B 21/06; F16B 21/07; F16B 37/045;
(Continued)

(56) References Cited

U.S. PATENT DOCUMENTS 2,752,116 A 6/1956 Minnus
3,737,130 A 6/1973 Shiraishi
(Continued)

FOREIGN PATENT DOCUMENTS

CN 1208358 A 2/1999
CN 201127153 Y 10/2008
(Continued)

OTHER PUBLICATIONS

European Search Report issued by the European Patent Office (Munich), dated May 2, 2018, for related Application No. EP17206193; 5 pages.
(Continued)

*Primary Examiner* — Jonathan P Masinick
(74) *Attorney, Agent, or Firm* — Bose McKinney & Evans LLP

(57) ABSTRACT

A first component with a fixing groove is affixed to a second component, using a ball-head screw having a thread and a ball head, a slot nut for the thread fitting into the fixing groove of the first component, and a fixation part having a ball head seat and a planar fixation support surface for fixing the fixation part to the second component. The ball head seat receives the ball head, forming a ball joint. In a central position, the fixation support surface is parallel and offset to a longitudinal axis of the ball-head screw. The ball-head seat includes recessed portions receiving a screw portion of the ball-head screw. An inclination angle between the longitudinal axis of the ball-head screw in the central position, and the longitudinal axis of the ball-head screw in the position when received in the recessed portion, is at least 90°.

16 Claims, 2 Drawing Sheets

(51) Int. Cl.
*F16C 11/10* (2006.01)
*F16B 21/08* (2006.01)
*F16B 37/04* (2006.01)
*F16M 13/02* (2006.01)
*F16B 9/00* (2006.01)
*F16B 7/00* (2006.01)

(52) U.S. Cl.
CPC ............. *F16B 9/09* (2018.08); *F16B 21/086* (2013.01); *F16C 11/0623* (2013.01); *F16C 11/0695* (2013.01); *F16C 11/106* (2013.01); *F16M 11/14* (2013.01); *F16M 13/02* (2013.01); *F16B 37/045* (2013.01)

(58) Field of Classification Search
CPC ... F16C 11/06; F16C 11/0623; F16C 11/0695; F16C 11/106; F16C 11/0619; F16C 11/0685; F16C 2226/74
See application file for complete search history.

(56) References Cited

U.S. PATENT DOCUMENTS

| | | | | |
|---|---|---|---|---|
| 4,712,814 A * | 12/1987 | Petterson | ............ | F16C 11/0619 285/325 |
| 5,209,619 A * | 5/1993 | Rinderer | ............... | F16B 37/045 411/553 |
| 5,775,654 A | 7/1998 | Price | | |
| 5,897,417 A * | 4/1999 | Grey | .................... | A63H 33/062 446/125 |
| 6,409,413 B1 * | 6/2002 | Bieg | ................... | F16C 11/0619 403/114 |
| 6,571,527 B1 * | 6/2003 | Rattini | ...................... | E04C 3/08 52/692 |
| 7,073,995 B2 * | 7/2006 | Herb | ....................... | F16B 43/00 411/85 |
| 7,766,594 B2 * | 8/2010 | Nehls | ..................... | F16B 37/00 411/435 |
| 7,891,615 B2 * | 2/2011 | Bevirt | .................... | F16M 11/40 248/163.1 |
| 9,101,200 B2 * | 8/2015 | Dickson | .................. | A45F 5/021 |
| 9,297,409 B2 * | 3/2016 | Kallas | ................. | F16M 11/2078 |
| 9,658,517 B2 * | 5/2017 | McElderry | ........... | G03B 17/566 |
| 9,772,066 B2 * | 9/2017 | Tseng | .................... | F16M 11/06 |
| 9,828,073 B1 * | 11/2017 | Cifers, III | ............. | F16M 13/02 |
| 10,155,306 B1 * | 12/2018 | Carnevali | ............ | F16M 11/045 |
| 10,429,002 B2 * | 10/2019 | Carnevali | ............. | F16M 13/02 |
| 2002/0166936 A1 | 11/2002 | Carnevali | | |
| 2005/0205730 A1 * | 9/2005 | Carnevali | ............. | F16M 11/14 248/163.1 |
| 2013/0249227 A1 * | 9/2013 | Lin | ........................ | F16M 13/06 294/142 |
| 2016/0265254 A1 * | 9/2016 | Carnevali | ............. | F16M 11/14 |
| 2017/0074316 A1 * | 3/2017 | Kim | ..................... | B25J 17/0275 |

FOREIGN PATENT DOCUMENTS

| | | |
|---|---|---|
| CN | 203488541 U | 3/2014 |
| DE | 2048592 A1 | 2/1972 |
| DE | 3927653 A1 | 3/1991 |
| DE | 9307092 U1 | 9/1993 |
| DE | 102004049467 A1 | 4/2006 |
| GB | 535305 B | 4/1941 |
| GB | 631690 B | 11/1949 |
| RU | 93727 U1 | 5/2010 |

OTHER PUBLICATIONS

Office Action issued by the Federal Institute of Industrial Property (FIIP), Moscow, Russia, dated Sep. 21, 2018, for Russian Patent Application No. 2017143176/12 (074411); 11 pages.
Office Action with English translation of the Search Report issued by the National Intellectual Property Administration, P.R. China, dated Feb. 3, 2020, for Chinese Patent Application No. 201711327295. 3; 10 pages.

* cited by examiner

FIXATION SYSTEM

The invention relates to a fixation system for fixing a first component provided with a fixing groove to a second component. The fixation system comprises a ball-head screw which has a thread and a ball head, a slot nut that is able to be screwed onto the thread and is configured to be inserted into the fixing groove of the first component, and a fixation part which has a ball-head seat and a planar fixation support surface for fixing the fixation part to the second component, wherein the ball-head seat receives the ball head, thereby forming a ball joint. By way of this fixation system, the two components can be connected together flexibly in different orientations using the ball joint.

The laid-open specification DE 39 27 653 A1 discloses a fixation system of this type, which serves for mounting wall or ceiling panels in a manner free of bending moments on mounting rails provided with a fixing groove. Acting as the fixation support surface is a support plate, which is oriented perpendicularly to a longitudinal axis of the ball-head screw in a central position of the ball joint. The ball joint is pivotable to all sides, but in a limited manner through an inclination angle, as is sufficient for the desired balancing of bending moments.

The invention is based on the technical problem of providing a fixation system of the type mentioned at the beginning, which establishes a functionally reliable fixation of two components to one another, requires few parts and is advantageous with regard to production costs and assembly effort.

The invention solves this problem by providing a fixation system configured for fixing a first component provided with a fixing groove to a second component, and which comprises a ball-head screw having a thread and a ball head, a slot nut to be screwed onto the thread, configured for inserting into the fixing groove of the first component, and a fixation part having a ball head seat and a planar fixation support surface for fixing the fixation part to the second component, wherein the ball head seat receives the ball head, thereby forming a ball joint, wherein in a central position of the ball joint, the fixation support surface is in parallel and offset in relation to a longitudinal axis of the ball-head screw, and wherein the ball-head seat comprises a plurality of recessed portions for receiving a screw portion of the ball-head screw adjoining the ball head in corresponding positions of the ball-head screw, wherein an inclination angle between the longitudinal axis of the ball-head screw in the central position and the longitudinal axis of the ball-head screw in the position when received in the recessed portion is at least 90°. Advantageous and preferred configurations of the invention are subjects of the claims, the wording of which is hereby incorporated in full in the description by reference.

In the fixation system according to the invention, the fixation support surface is parallel and offset in relation to a longitudinal axis of the ball-head screw in a central position of the ball joint. Furthermore, the ball-head seat has a plurality of recessed portions for receiving a screw portion, adjoining the ball head, of the ball-head screw in corresponding positions of the ball-head screw, wherein an inclination angle between the longitudinal axis of the ball-head screw in the central position and the longitudinal axis of the ball-head screw in the position when received in the recessed portion is at least 90°. Thus, the invention provides a fixation system which allows functionally reliable and positionally flexible fixation of two components to one another, wherein the fixation system manages with few parts and is advantageous with regard to production costs and assembly effort.

The fixing groove can be for example a slot or a groove, in particular a T-slot or a trapezoidal slot. The slot nut that is able to be screwed on can be for example a nut or a combination of a nut and washer or a slot nut which has an internal thread. The maximum possible inclination angle of the ball-head screw can be for example between 90° and 120°. It is possible for example for two, three, four or more recessed portions to be provided. The second component can be connected to the fixation support surface for example in a materially integral or form-fitting manner.

In one configuration of the invention, a nut seating is disposed on the ball-head screw between the ball head and the ball-head screw end located opposite the latter. The nut seating can be for example in the form of a disc. The nut seating can have for example a hexagonal geometry, which is configured to receive an open-end spanner.

In one configuration of the invention, the ball-head screw and the nut seating are in one piece or the nut seating is able to be screwed onto the ball-head screw. When the ball-head screw and the nut seating are embodied in one piece, the number of components required and thus the assembly effort are reduced. The nut seating can be for example a component which has an internal thread, wherein the internal thread of the nut seating corresponds to the thread of the ball screw. The nut seating can be for example a nut or a combination of a nut and washer, wherein the nut is screwed onto the thread of the ball-head screw.

In one configuration of the invention, the ball head is received by the ball-head seat in a releasable snap-lock connection. The releasable snap-lock connection makes it easier for example for the ball-head screw or the fixation part to be able to be fixed to the second or first component, respectively, independently of the other part in each case, and only then for joining to take place by simple snap-locking. The snap-lock connection can have for example snap-lock elements which are configured to enclose the ball head. In addition, the releasability of the snap-lock connection as required allows corresponding disassembly.

In one configuration of the invention, the fixation part has a fixation portion, of which a first side has at least part of the fixation support surface and a second side has at least part of a second fixation support surface. When the fixation portion has two fixation support surfaces, the number of possible fixation positions of the fixation part on the second component increases.

In one configuration of the invention, the fixation part has a through-hole and/or a thread. The through-hole can be embodied in the form of a counterbore. The thread and/or the through-hole can be suitable for example for establishing a bolted connection or some other bolt-based connection between the fixation part and the second component. The fixation part can have for example a bore. The through-hole and/or the bore can be configured for example to serve as an assembly aid or assembly orientation means. A bore can be understood to be any desired opening.

In one configuration of the invention, the fixation part has at least one receiving groove, in particular two receiving grooves. The receiving groove can be configured for example to receive and/or guide the second component or a third component. The receiving groove can be configured for example to serve as an assembly aid or assembly orientation means.

In one configuration of the invention, the ball-head seat has four recessed portions that are disposed at an angle of 90° to one another. The recessed portions can be designed such that a screw portion adjoining the ball head can be received in these recessed portions. The recessed portions can be configured to limit the rotatability of the ball-head screw within the ball-head seat. A connecting axis between two recessed portions can be for example parallel to the fixation support surface.

In one configuration of the invention, the fixation part has a recess for receiving the nut seating in a corresponding position. The fixation part can act for example as a covering cap for the nut seating or screen.

Advantageous embodiments of the invention are illustrated in the drawings and explained in more detail in the following text. In the drawings.

Figure 1:
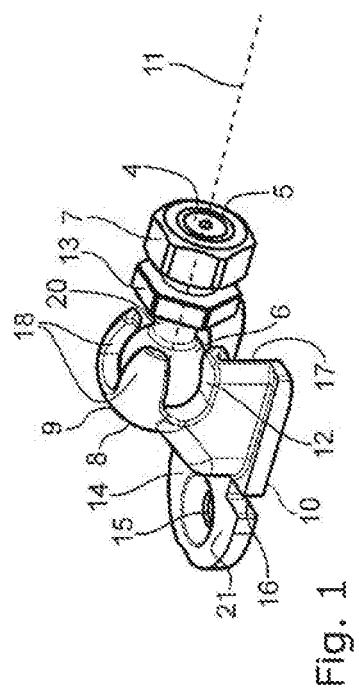
FIG. 1 shows an oblique view of a fixation system in a central position.

The fixation system shown in FIGS. 1 to 8 is configured to fix a first component 2 provided with a fixing groove 1 to a second component 3. The shown first component 2 has a mounting rail region which has the fixing groove 1 along its entire length. The second component 3 has a planar surface to which the fixation system can be attached.

FIGS. 1 to 4 show the fixation system, which is configured to connect the first component 2 to the second component 3. The fixation system has a ball-head screw 4 and a fixation part 8. The ball-head screw 4 has a thread 5 and a ball head 6. Between the ball head 6 and a ball-head screw end located opposite the latter with respect to a longitudinal axis 11 of the ball-head screw 4, a nut seating 13 is disposed on the ball-head screw 4. The ball-head screw 4 and the nut seating 13 are preferably embodied in one piece. In an embodiment that is not shown, the nut seating 13 is able to be screwed onto the thread 5 of the ball-head screw 4. The nut seating 13 has for example a hexagonal geometry, or alternatively some other polygonal shape, which is configured to receive an open-end spanner or a similar tool. Disposed between the ball head 6 and the nut seating 13 is a shaft portion 20 of the ball-head screw 4.

Screwed onto the thread 5 of the ball-head screw 4 is a screw-on slot nut 7 in the form of a nut. The slot nut 7 is designed to be inserted into the fixing groove 1 of the first component 2.

The ball head 6 is received in a ball-head seat 9 of the fixation part 8, preferably, as shown, by a releasable snap-lock connection. For this purpose, the ball-head seat 9 has two snap lugs 18 which engage over the ball head 6. The ball-head seat 9 receives the ball head 6, thereby forming a ball joint.

Furthermore, the fixation part 8 has a fixation portion 21, a planar first fixation support surface 10 and a planar second fixation support surface 14. The fixation portion 21 has, on a first side, part of the first fixation support surface 10 and, on an opposite second side, the second fixation support surface 14. The second fixation support surface 14 is parallel to the first fixation support surface 10. The second fixation support surface 14 has a stop. The first and second fixation support surfaces 10, 14 are configured to establish respective abutting contact with a planar surface of the second component 3. Furthermore, the fixation portion 21 has a through-hole 15 in the form of a counterbore and two opposite receiving grooves 16. The through-hole 15 is configured to receive a screw in order in this way to fix the fixation system to the second component 3 by means of a screwed connection. The receiving grooves 16 are configured to receive a third component 19, for example as an assembly aid.

The fixation part 8 has a recess 17 which is configured to receive the nut seating 13 when the ball-head screw 4 and the fixation part 8 are inclined in a corresponding manner with respect to one another. This is the inclined position shown in FIG. 4. The recess 17 has the shape of a flat of an open-end spanner, such that a screwed connection between the slot nut 7 in the fixing groove 1 and the ball-head screw 4 can be established or tightened and released again without the use of an additional tool. This takes place in that the fixation part 8 is rotated in this position, wherein the nut seating 13 received in the recess 17 is rotated and the ball-head screw 4 is co-rotated via the nut seating 13.

In FIG. 1, a central position of the ball joint is shown, in which the longitudinal axis 11 is parallel and offset in relation to the first fixation support surface 10. The ball-head seat 9 has four recessed portions 12 for receiving the shaft portion 20, wherein three recessed portions 12 are bounded by the snap lugs 18. The four recessed portions 12 are configured to define the freedom of movement of the ball-head screw 4 in a corresponding manner, wherein they are disposed in a manner offset at an angle of 90° to one another in a ball-joint circumferential direction. The orientation of the longitudinal axis 11 in a respective inclined position of the ball-head screw 4 with respect to the central position is specified by an inclination angle α.

Figure 2:
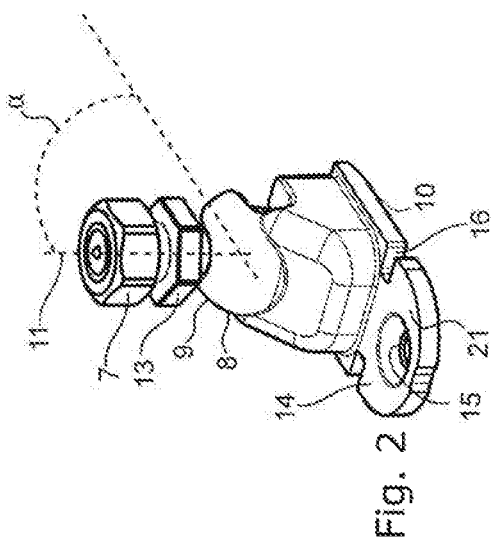
FIGS. 2 to 4 show oblique views of the fixation system from FIG. 1 in positions that are inclined in each case through 90° with respect to the central position.
Figure 3:
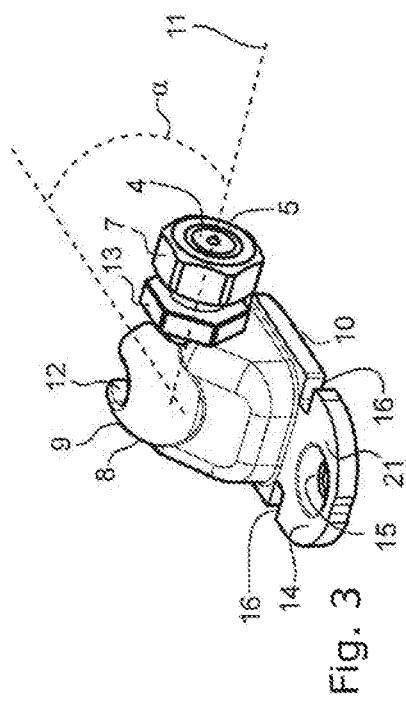
Figure 4:
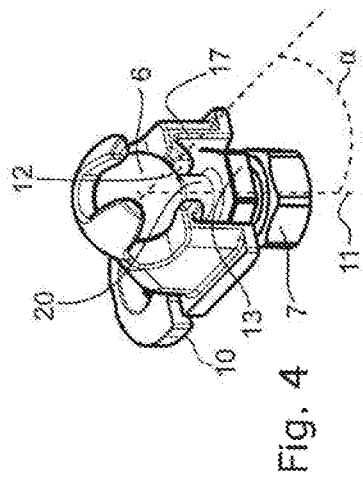

In FIGS. 2 to 4, the shaft portion 20 of the ball-head screw 4 is received in each case in one of the four recessed portions 12 of the fixation system. In each of the shown positions of the ball-head screw 4, the inclination angle α of the longitudinal axis 11 with respect to the central position is 90°. Furthermore, in FIG. 4, the nut seating 13 is received in the recess 17 and the longitudinal axis 11 is oriented orthogonally to the first fixation support surface 10.

Figure 5:
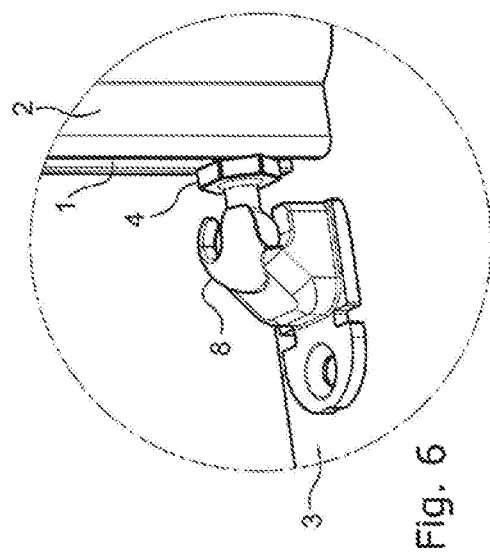
FIG. 5 shows an oblique view of the fixation system and of two components fixed together thereby.

FIG. 5 shows a connection between the first component 2 and the second component 3 by the fixation system in a first orientation. In this case, the slot nut 7 has been inserted into the fixing groove 1 of the first component 2 and cooperates with the ball-head screw 4 as a screwed connection. The ball-head screw 4 is inclined with respect to the fixation part through about 90° with respect to the central position. The second component 3 bears against the second fixation support surface 14 of the fixation part 8. The second component 3 is connected to the second fixation support surface 14 by a materially integral connection, in particular an adhesive connection. The shaft portion 20 is received in one of the recessed portions 12. Additionally or alternatively to the adhesive connection, the fixation part 8 can be screwed to the second component 3 by means of a screw inserted into the through-hole 15.

Figure 6:
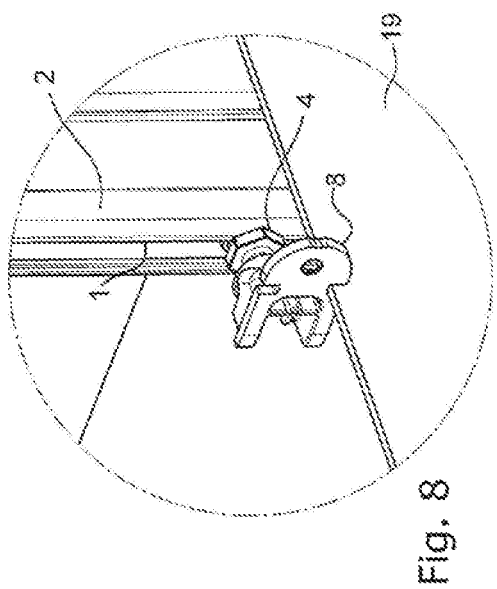
FIGS. 6 to 8 show oblique views of the fixation system according to FIG. 5 in further fixing situations.
Figure 7:
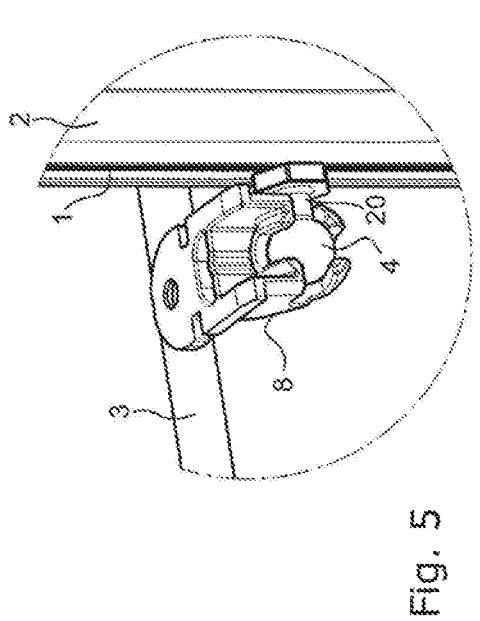

FIGS. 6 and 7 show a connection between the first component 2 and the second component 3 by the fixation system in a different orientation. In this case, the second component 3 bears against the first fixation support surface 10 of the fixation part 8. In FIG. 6, the fixation system is located approximately in the central position of its ball joint, wherein, in FIG. 7, the ball-head screw 4 is inclined through about 90° with respect to the central position.

Figure 8:
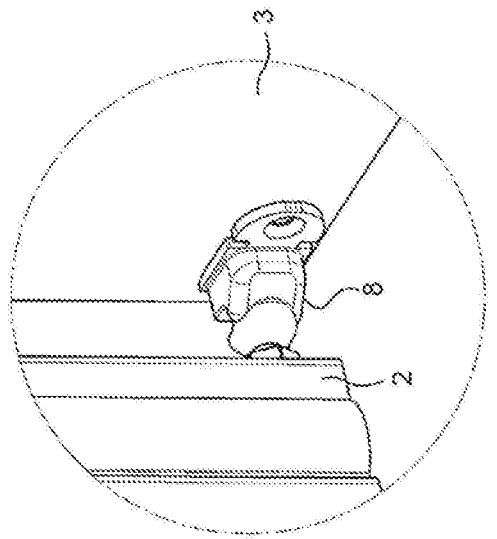

FIG. 8 shows the third component 19 being received in the receiving groove 16. The third component 19 is received in the receiving groove 16 in order to orient the fixation part 8. The second component 3, which is not shown in FIG. 8, can be connected to the fixation part 8 oriented in this way.

The first component 2 can be for example a hose reel box, as is disclosed in the earlier German patent application 10 2015 226 412.2, to which reference can be made here for further details and the contents of which are hereby incorporated in full in the present application by reference. The second component 3 and the third component 19 can in this case be for example walls of a washbasin base unit or kitchen-sink base unit in which the hose reel box is accommodated, such as a rear wall, a base wall and/or a side wall of said base unit.

In an embodiment of the invention that is not shown, the fixation part 8 has a thread and/or a bore. The thread can be used for example to screw the fixation part 8 to the second component 3. The bore can be used for example to orient the fixation part 8 on the second component 3.

As the exemplary embodiments explained above make clear, the invention provides a fixation system which allows the functionally reliable and positionally flexible fixing of two components to one another. The fixation system itself has a small number of parts and is advantageous in terms of production costs and assembly effort.

The invention claimed is:

1. A fixation arrangement comprising:
   a fixation system,
   a first component having a fixing groove, and
   a second component fixed to the first component by the fixation system,
   wherein the fixation system comprises:
   a ball-head screw having a thread and a ball head,
   a slot nut screwed onto the thread and inserted into the fixing groove of the first component so as to be engaged by the fixing groove, the slot nut configured to slide along the fixing groove in a sliding direction orthogonal to a longitudinal axis of the ball-head screw, and
   a fixation part having a ball head seat and a planar fixation support surface for fixing the fixation part to the second component,
   wherein the ball head seat receives the ball head, thereby forming a ball joint,
   wherein in a central position of the ball joint, the fixation support surface is in parallel and offset in relation to a longitudinal axis of the ball-head screw, and
   wherein the ball-head seat comprises a plurality of recessed portions for receiving a screw portion of the ball-head screw adjoining the ball head in corresponding positions of the ball-head screw, wherein an inclination angle between the longitudinal axis of the ball-head screw in the central position and the longitudinal axis of the ball-head screw in the position when received in the recessed portion is at least 90°.

2. The fixation system according to claim 1, wherein a groove support is disposed on the ball-head screw between the ball head and the ball-head screw end opposite thereto.

3. The fixation system according to claim 2, wherein the ball-head screw and the groove support are in one piece.

4. The fixation system according to claim 2, wherein the groove support can be screwed onto the ball-head screw.

5. The fixation system according to claim 1, wherein the ball-head seat receives the ball head in a releasable snap-lock connection.

6. The fixation system according to claim 1, wherein the fixation part includes a fixation portion, wherein a first side thereof includes at least part of the fixation support surface and a second side includes at least part of a second fixation support surface.

7. The fixation system according to claim 1, wherein the fixation part includes at least one of a through hole and a thread.

8. The fixation system according to claim 1, wherein the fixation part includes at least one receiving groove.

9. The fixation system according to claim 1, wherein the ball head seat includes four recessed portions, disposed at an angle of 90° in relation to each other.

10. A fixation system, configured for fixing a first component provided with a fixing groove to a second component, said fixation system comprising:
    a ball-head screw having a thread and a ball head,
    a slot nut to be screwed onto the thread, configured for inserting into the fixing groove of the first component,
    a fixation part having a ball head seat and a planar fixation support surface for fixing the fixation part to the second component,
    wherein the ball head seat receives the ball head, thereby forming a ball joint,
    wherein in a central position of the ball joint, the fixation support surface is in parallel and offset in relation to a longitudinal axis of the ball-head screw,
    wherein the ball-head seat comprises a plurality of recessed portions for receiving a screw portion of the ball-head screw adjoining the ball head in corresponding positions of the ball-head screw, wherein an inclination angle between the longitudinal axis of the ball-head screw in the central position and the longitudinal axis of the ball-head screw in the position when received in the recessed portion is at least 90°,
    wherein a groove support is disposed on the ball-head screw between the ball head and the ball-head screw end opposite thereto, and
    wherein the fixation part includes a recess for receiving the groove support in a corresponding position.

11. The fixation system according to claim 10, wherein the ball-head screw and the groove support are in one piece.

12. The fixation system according to claim 10, wherein the ball-head seat receives the ball head in a releasable snap-lock connection.

13. The fixation system according to claim 10, wherein the fixation part includes a fixation portion, wherein a first side thereof includes at least part of the fixation support surface and a second side includes at least part of a second fixation support surface.

14. The fixation system according to claim 10, wherein the fixation part includes at least one of a through hole and a thread.

15. The fixation system according to claim 10, wherein the fixation part includes at least one receiving groove.

16. The fixation system according to claim 10, wherein the ball head seat includes four recessed portions, disposed at an angle of 90° in relation to each other.

* * * * *